United States Patent Office 3,377,384
Patented Apr. 9, 1968

3,377,384
COMPOSITIONS FOR CONTROLLING
PLANT GROWTH
Edwin Dorfman, Grand Island, N.Y., assignor to Hooker
Chemical Corporation, Niagara Falls, N.Y., a corporation of New York
No Drawing. Filed Nov. 24, 1961, Ser. No. 154,833
The portion of the term of the patent subsequent to
Oct. 31, 1978, has been disclaimed
10 Claims. (Cl. 260—611)

This invention comprises new halogenated benzyl polyether compositions and methods for their use in control of weeds.

This invention relates to a method of controlling the growth of undesirable vegetation by the application of certain new herbicidal compositions of matter known as the trichlorinated benzyl polyethers. More particularly, this invention describes compositions and processes for the control or eradication of certain troublesome weeds, the compositions having the structure:

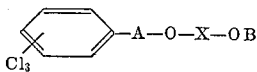

wherein A is an alkylene radical of one to two carbon atoms, and X is a radical chosen from the group consisting of alkylene, alkylene-oxy-alkylene, hydroxyalkylene and trichlorobenzyloxyalkylene radicals, and where B is an organic radical chosen from the group comprising, alkyl, alkoxyalkyl, trichlorobenzyl, trichlorobenzyloxyalkyl, phenyl and chlorinated phenyl.

The preferred composition embodiments of this invention for reasons of low cost and high activity, are those in which A equals methylene, X equals alkylene or alkyleneoxyalkylene having from two to three carbon atoms in each alkylene and where B equals trichlorobenzyl or an alkyl of four carbon atoms or less (hereinafter called "lower alkyl"), and where at least thirty percent of the trichlorobenzyl groups have the 2,3,6-configuration.

Examples of compositions intended to be comprised within the scope of this invention include the following:

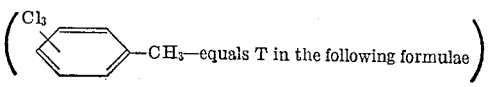

T—OCH$_2$CH$_2$OCH$_3$
T—OCH$_2$CH$_2$OC$_2$H$_5$
T—OCH$_2$CH$_2$OCH(CH$_3$)$_2$
T—O—CH$_2$CH$_2$OC$_4$H$_9$
T—O—CH(CH$_3$)CH$_2$—OC$_2$H$_5$
T—O—CH$_2$CH(CH$_3$)OCH$_3$
T—O—CH$_2$CH$_2$CH$_2$CH$_2$OCH$_3$
T—O—CH(CH$_3$)CH(CH$_3$)—O—C$_4$H$_9$
T—O—CH$_2$CH$_2$OCH$_2$CH$_2$OCH$_3$
T—O—CH$_2$CH$_2$OCH$_2$CH$_2$OC$_2$H$_5$
T—O—CH$_2$CH$_2$OCH$_2$CH$_2$OC$_4$H$_9$

T—O—CH(CH$_3$)CH$_2$OCH$_2$CH$_2$OC$_4$H$_9$
T—O—CH(CH$_3$)CH$_2$OCH(CH$_3$)CH$_2$OCH$_3$
T—O—CH$_2$CH$_2$OCH$_2$CH$_2$OCH$_2$CH$_2$OC$_2$H$_5$

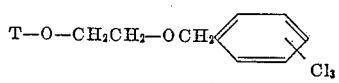

T—O—CH$_2$CHOHCH$_2$OC$_2$H$_5$

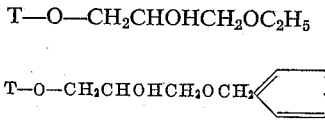

T—O—CH$_2$CHOHCHOHCHOHCH$_2$O—T
T—O—CH$_2$C(CH$_2$OH)$_2$CH$_2$O—T
T—O—CH$_2$CH(OT)CH$_2$OT
T—O—CH$_2$C(CH$_2$OT)$_2$CH$_2$OT

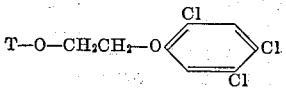

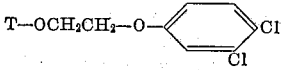

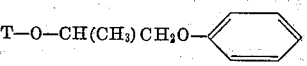

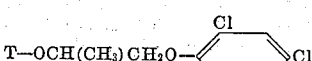

T—CH$_2$OCH$_2$CH$_2$OCH$_3$
T—CH$_2$OCH$_2$CH$_2$OC$_2$H$_5$
T—CH$_2$OCHCH(CH$_3$)—OCH$_2$T
T—CH$_2$O—CH(CH$_3$)CH$_2$OCH$_3$
T—CH$_2$OCH(CH$_3$)CH$_2$OC$_2$H$_3$
T—O—CH$_2$CH$_2$OCH$_2$OCH$_2$CH$_2$O—T
T—O—CH$_2$—O—T

It is to be noted that the diether or polyether structure is critical; related monoethers are substantialy inactive.

The compositions used in the novel method of this invention are low melting waxy solids or liquids prepared by the chlorination of toluene or orthochlorotoluene, or less conveniently, of 2,6-dichlorotoluene, 2,5-dichlorotoluene, 2,3-dichlorotoluene or a mixture thereof, in the presence of a Lewis acid catalyst such as $FeCl_3$, $SnCl_4$, $SbCl_5$, $I_2$, $MoCl_5$, $AlCl_3$, $BF_3$, or the like, to the point where three chlorines are introduced on the aromatic ring; then by thermal or photochemical chlorination, one atom of chlorine is introduced in the side chain. Where A is $-C_2H_4-$, the next higher homologs of the above-named starting materials, i.e., the corresponding ethylbenzenes, are used as starting materials. The trichlorobenzyl chloride or trichlorophenylethyl chloride (which when prepared as described is a mixture containing at least thirty percent of the 2,3,6-trichloroisomer), is then reacted (in the known manner of a Williamson ether synthesis), with a molar excess of a compound of the structure HO—X—OB in the presence of an acid acceptor such as a caustic soda, caustic potash, or other strong inorganic or organic base. The preferred composition embodiments are made by reacting trichlorobenzyl chloride mixture (made as described above and containing at least thirty percent 2,3,6-trichlorobenzyl chloride) with a molar excess of lower alkyl-monoether of ethylene glycol, propylene glycol, diethylene glycol, dipropylene glycol or hydroxyethoxypropanol, to give those compositions where B is lower alkyl.

The etherification reaction described above is generally carried out by heating the reactants together at from slightly above room temperature to the boiling point of the alcohol ether employed, using an excess of the reactant HO—X—OB as solvent. However, where convenient, a co-solvent such as dioxane or another inert organic liquid with the appropriate physical characteristics may be used. Alternatively the product from a preceding run may also be used as solvent.

While the pure 2,3,6 - trichlorobenzyl polyethers undoubtedly would be highly active, there is little incentive to resolve these mixtures by the tedious and expensive separation procedures involved. A reason for using the isomeric reaction mixtures or a 2,3,6 - enriched addition thereof is that curiously enough, while the 2,4,5 - 2,3,4-, 3,4,5- and 2,4,6 - isomers individually show almost no herbicidal activity, for reasons presently unclear, they do appear to contribute a significant portion of the herbicidal activity possessed by the isomer mixture containing at least thirty percent of the 2,3,6 - isomer.

Under the conditions set forth above, an isomeric mixture of thirty to seventy percent 2,3,6 - trichloro isomer is produced. Where a higher proportion of the 2,3,6-isomer is desired, the 2,3,6 - isomer content may be enriched up to the one hundred percent level by utilizing the technique of Brimelow et al., disclosed in J. Chem. Soc., 1208–1212 (1951), to isolate pure 2,3,6 - trichlorotoluene for use as an intermediate to prepare the trichlorobenzyl chloride.

Among the obvious advantages of these inventive compositions and methods is that they offer a means of controlling weeds at two important stages of their growth, that is prior to their emergence and after they have emerged as seedlings. Thus, the inventive method offers more opportunity to control the weed population than is offered by those compositions which only lend themselves to pre- or post-emergence use alone.

An additional advantage of these inventive herbicidal compositions is that while they possess high phytotoxicity toward weeds after emergence, they are selective herbicides and exhibit low phytotoxicity against certain crops such as corn, sugar cane, grapes and turf grasses, thus enabling the grower to dispense with the more laborious and expensive machine and hand cultivating to remove the weed population competing with his crops.

Another advantage of these inventive compositions is high activity towards deeply rooted perennial weeds, aquatic weeds and towards brush.

While selectivity and low phytotoxicity toward the broadleaf crops is an important attribute possessed by the inventive compositions, there are equally important additional advantages, some of which will be disclosed for the sake of illustration.

An additional advantage of the novel compositions of this invention is that they lend themselves to the use of various grades of purity ranging from the highly purified oil or crystalline product to a technical crude. Furthermore, these herbicidal compositions offer the advantage of compatibility with a host of other herbicides including the tri- and tetra - chlorophenylacetic acids, trichlorobenzyloxyalkanols, sodium borates and calcium borates, 2,4 - D and other herbicidal phenoxyaliphatic acids and esters, simazine and other herbicidal triazines, monuron, fenuron, diuron and other herbicidal ureas, sodium chlorate, petroleum oils, hexachlorocyclopentadiene, pentachlorophenol, dinitro - o - alkylphenols, sodium trichloroacetate, and sodium 2,2 - dichloropropionate, with fungicides such as the metal dimethyldithiocarbamates and ethylenebis - (dithiocarbamates), with insecticides such as benzene hexachloride and chlordane, with fertilizers such as urea and ammonium nitrate, and various adjuvants and diluents well known to the art. Thus, these herbicides may be used by themselves or made the subject of liquid or solid formulations ranging from the very simple to the most complex. For example, if it is desired these compositions may be made the subject of a liquid formulation by diluting, dispersing, dissolving or emulsifying with a surface active adjuvant or combination of these adjuvants in water or organic solvents such as petroleum hydrocarbons, alcohols, ketones, esters, glycols or combinations thereof. Or alternatively, the novel herbicides may be made up as solid formulations of powders, dusts, wettable dusts, granules and pellets using solid diluents such as talcs, clays, flours, starches, diatomaceous earths, mica, alkaline earth limes, carbonates and phosphates either finely divided, granular or pelleted in form.

These solid and liquid formulations facilitate handling and application. The adjuvants and admixtures enhance herbicidal activity to more than an additive degree.

The liquid compositions, whether solutions or dispersions of the active agents in a liquid solvent and also the wettable powder or dust compositions of this invention may contain as a conditioning agent one or more surface active agents in amounts sufficient to render the composition readily dispersible in water. By the term surface active agents are included wetting agents, dispersing agents, emulsifying agents, and the like. A satisfactory but not complete list of such agents is set forth in an article in "Soap and Chemical Specialties," vol. 31, No. 7, pages 50–61; No. 8, pages 48–61; No. 9, pages 52–67, and No. 10, pages 38–67 1955. Other sources of adjuvant materials are set forth in Bulletin E–607 of the Bureau of Entomology and Plant Quarantine of the United States Department of Agriculture.

While the manner and method of application of the inventive compositions is varied and largely dependent upon the climatic conditions, crop treated, the weeds to be eradicated, the equipment available and the convenience of the user, a preferred embodiment of this invention is to apply these herbicides as a spray after making them up as a liquid formulation comprised of several times their weight of non-phytotoxic solvents, such as xylene, with small quantities of an emulsifier, such as a commercial polyoxyethylene ether, and a surfactant, such as alkyl-aryl sulfonate mixture. This type of mixture is emulsified with water and sprayed on the weed population growing amidst the desired crop such as corn, sugar cane, turf grasses, grapes, etc., or on a noncrop area to be freed of weed growth. Or alternatively, these compositions may be applied as a solid formulation directly to the ground.

The rate of application cannot be precisely stated due to varying degrees of resistance possessed by the weed species and crop, the stage of weed and crop growth, the soil type and climatic conditions, but in general, the rates will be at least one-quarter of a pound of herbicide per acre, and for reasons of cost will seldom exceed two hundred pounds per acre, with the preferred range falling within one-half to one hundred pounds per acre. Where the weeds are in an early stage of growth, being more susceptible, they will frequently respond to the rates from one-half to four pounds per acre while older weeds or weeds that are to be totally eradicated may require rate in excess of four pounds per acre. In those instances where the weed population has been allowed to accumulate unchecked or where mature plants are encountered, applications of up to fifty pounds per acre and even beyond this rate may be required. For eradication of deeply-rooted herbicide-resistant perennial weeds such as field bindweed, rates of ten to one hundred pounds are found best. For soil sterilization for extended periods of time (i.e., more than one or two months), ten to one hundred pounds are found best.

The following examples are intended to illustrate the workings of this invention, including such facets as the preparation of the herbicidal compositions, their formulation as herbicidal agents, and the testing results obtained using representative compounds as herbicides. The details of certain embodiments, either in the preceding specification or foregoing examples are not intended to place limitations upon the inventive method, except as set forth in the claims.

Example 1

This example shows the preparation and analysis of the compositions above described; the members of the X group in the above-shown general formula are indicated in the first column of the chart below.

Toluene was chlorinated at sixty to seventy degrees centigrade in the presence of 0.1 percent ferric chloride as a catalyst until the weight uptake indicated about 2.5 moles of chlorine had reacted. The product was distilled and the fraction boiling at one hundred and twenty to one hundred and forty degrees centigrade (twenty millimeters of mercury pressure), was taken. Analysis by infrared indicated an isomer content of twenty-five to forty percent 2,4,5-, forty to fifty percent 2,3,6-, and ten to fifteen percent 2,3,4-trichlorotoluene. This trichlorotoluene was chlorinated at one hundred to two hundred degrees centigrade under irradiation by a mercury vapor lamp until 0.7 to 0.8 mole of hydrogen chloride per mole of trichlorotoluene was evolved. This product was fractionated to obtain the trichlorobenzyl chloride fraction, boiling point one hundred and thirty-one to one hundred and fifty-two degrees centigrade (six mm.). This trichlorobenzyl chloride was added with stirring to 1.5 mole equivalents of caustic soda in a molar excess of the chosen glycol ether, at one hundred and forty to one hundred and fifty degrees centigrade, and the reaction mixture heated and stirred for about three hours. The mixture was then poured into water, exhaustively extracted with toluene, and the toluene extracts combined and distilled, where possible, under reduced pressure in a short-path still, to obtain the desired product. In some cases, the product showed evidence of decomposition on attempted distillation, and was therefore used in the undistilled state. Infrared analysis shows these products to have substantially the same isomer distribution as the trichlorotoluene intermediates from which they were made.

Examples of products produced, the starting materials employed and properties of the products are given in the following table.

| Cpd. | Product | Alcohol Reactant | Isomer Composition of Trichlorobenzyl Moiety | Physical Properties | Percent Chlorine Calc'd. | Percent Chlorine Found |
|---|---|---|---|---|---|---|
| 1 | Cl₃C₆H₂CH₂OCH₂CH₂OCH₃ | CH₃OCH₂CH₂OH | A[1] | Oil, B.P. 90–103° (0.005 mm.) | 39.5 | 31.2 |
| 2 | Cl₃C₆H₂CH₂OCH₂CH₂OCH₂CH₂CH₃ | C₄H₉OCH₂CH₂OH | A | Oil, B.P. 117–121° (0.02 mm.) | 34.1 | 35.0 |
| 3 | Cl₃C₆H₂CH₂OCH₂CH₂OCH₂CH₂CH₃ | C₂H₅OCH₂CH₂OCH₂CH₂OH | A | Oil, decomp. on dist. | 32.5 | 31.9 |
| 4 | Cl₃C₆H₂CH₂OCH₂CH₂OCH₂CH₂OC₄H₉ | C₄H₉OCH₂CH₂OCH₂CH₂OH | A | ...do... | 29.9 | 29.1 |
| 5 | Cl₃C₆H₂CH₂OCH(CH₃)CH₂OC₂H₅ | C₂H₅OCH(CH₃)OH | A | Oil, B.P. 105–112° (0.005 mm.) | 35.8 | 35.9 |

See footnote at end of table.

| Cpd. | Product | Alcohol Reactant | Isomer Composition of Trichlorobenzyl Moiety | Physical Properties | Percent Chlorine Calc'd. | Percent Chlorine Found |
|---|---|---|---|---|---|---|
| 6 | Cl₃⟨⟩CH₂OCH(CH₃)CH₂OCH(CH₃)CH₂OCH₃ | CH₃OCH₂CH(CH₃)OCH₂CH(CH₃)OH | A | Oil, decomp. on dist. | 31.2 | 30.8 |
| 7 | Cl₃⟨⟩CH₂OCH₂CHOHCH₂OC₂H₅ | C₂H₅OCH₂CHOHCH₂OH | A | do | 33.9 | 33.6 |
| 8 | Cl₃⟨⟩CH₂OCH₂CH₂OCH₂CH₂OCH₂⟨⟩Cl₃ | Diethylene glycol trichlorobenzyl monoether | A | Colorless wax | 43.2 | 42.7 |
| 9 | Cl₃⟨⟩CH₂OCH₂CH₂OCH₂⟨⟩Cl₃ | Ethylene glycol trichlorobenzyl monoether | A | do | 47.4 | 46.9 |
| 10 | Cl₃⟨⟩CH₂OCH₂CH₂CH₂OCH₂⟨⟩Cl₃ | 1,3-propanediol(trichlorobenzyl) monoether | A | do | 46.0 | 46.0 |
| 11 | Cl₃⟨⟩CH₂OCH₂CH₂OCH₃ | CH₃OCH₂CH₂OH | B¹ | Oil, B.P. 91–99° (0.005 mm.) | 39.5 | 39.5 |
| 12 | Cl Cl⟨⟩Cl CH₂OCH₂CH₂OCH₃ | CH₃OCH₂CH₂OH | 2,3,6- | Oil, B.P. 92–96° (0.005 mm.) | 39.5 | 39.4 |
| 13 | Cl₃⟨⟩CH₂OCH₂CH₂OC₂H₅ | C₂H₅OCH₂CH₂OH | B | Oil, B.P. 105–110° (.005 mm.) | 37.5 | 38.2 |
| 14 | Cl Cl⟨⟩Cl CH₂OCH₂CH₂OC₂H₅ | C₂H₅OCH₂CH₂OH | 2,3,6- | Oil, B.P. 106–107° (.0035 mm.) | 37.5 | 38.3 |
| 15 | Cl₃⟨⟩CH₂OCH₂CH(CH₃)OCH₂⟨⟩Cl₃ | Propylene glycol trichlorobenzyl monoether | A | Colorless wax | 46.0 | 45.8 |
| 16 | Cl₃⟨⟩CH₂OCH₂CH(CH₃)OCH₂⟨⟩Cl₃ | do | B | do | 46.0 | 45.1 |
| 17 | Cl Cl⟨⟩Cl CH₂OCH₂CH(CH₃)OCH₂⟨⟩Cl Cl Cl | do | 2,3,6- | do | 46.0 | 46.1 |

See footnote at end of table.

| Cpd. | Product | Alcohol Reactant | Isomer Composition of Trichlorobenzyl Moiety | Physical Properties | Percent Chlorine Calc'd. | Percent Chlorine Found |
|---|---|---|---|---|---|---|
| 18 | Cl-C6H2(Cl)(Cl)-CH2OCH2CH2OCH3 | CH3OCH2CH2OH | 2,4,5- [A] | Oil, B.P. 95-105° (0.005 mm.) | 39.5 | 39.3 |
| 19 | Cl-C6H2(Cl)(Cl)-CH2OCH2CH2OCH2-C6H2(Cl)(Cl)(Cl) | Ethylene glycol trichlorobenzyl monoether | 2,4,5- [A] | Colorless wax | 47.4 | 48.2 |
| 20 | Cl-C6H2(Cl)(Cl)-CH2OCH2CH(CH3)OCH2-C6H2(Cl)(Cl)(Cl) | Propylene glycol trichlorobenzyl monoether | 2,4,5- [A] | do | 46.0 | 45.3 |
| 21 | Cl-C6H2(Cl)(Cl)-CH2OCH2CH2OCH2-C6H2(Cl)(Cl)(Cl) | Ethylene glycol trichlorobenzyl monoether | 2,3,6- [B] | do | 47.4 | 47.0 |

[A] = Approximately 40–50% 2,3,6-, 25–40% 2,4,5-, 10–15% 2,3,4-, 5–10% trichloro isomers as derived by ferric chloride catalyzed trichlorination of toluene.
[B] = Approximately 60–70% 2,3,6-, 30–40% 2,4,5-, as derived by ferric chloride catalyzed chlorination of orthochlorotoluene to trichlorotoluene.

Example 1A

An area infested with the seeds of annual broadleaf weeds (principally ragweed, pigweed and lamb's-quarters), and annual broadleaf grasses (principally crabgrass and witchgrass) was plowed, disced, demarcated into test plots, and seeded with corn, following which the plots were sprayed with various test chemicals at four pounds per acre. One month later, the plots were inspected for weed control and crop damage.

| Compound No. | Percent Control Broadleaf Weeds | Percent Control Grasses | Corn Injury |
|---|---|---|---|
| 1 | 95 | 95 | Nil. |
| Trichlorobenzyl ethyl ether | 0–5 | 0–5 | Trace. |
| 2 | 95 | 95 | Slight. |
| 3 | 100 | 100 | Trace. |
| 4 | 100 | 100 | Nil. |
| Trichlorobenzyl butyl ether | 0–5 | 0–5 | Trace. |
| 13 | 100 | 100 | Do. |
| 14 | 100 | 100 | Do. |
| 18 | 0–5 | 0–5 | Nil. |
| 19 | 0–5 | 5 | Nil. |
| 20 | 0–5 | 5 | Nil. |
| 21 | 100 | 100 | Trace. |
| 2,4-dichlorophenoxyacetic acid (2,4,-D) | 100 | 0–10 | Do |
| N,N-diallyl-2-chloroacetamide (Randox) | 0–10 | 100 | Nil. |
| Untreated plots | 0 | 0 | |

Example 2.—Formulation of an emulsifiable concentrate

The following ingredients were blended:

| | Pounds |
|---|---|
| Compound 15 of Example 1 | 200 |
| Emulsifier (polyoxyethylene sorbitan laurate-sodium alkylarylsulfonate blend) | 30 |

Xylene was added to make a total volume of 100 gallons of solution.

The resultant formulation was a four-pound-per-gallon liquid concentrate emulsifiable with water.

Example 3.—Formulation of an emulsifiable concentrate

The following ingredients were blended:

| | Parts by wt. |
|---|---|
| Compound 17 of Example 1 | 1.0 |
| Emulsifier (polyoxyethylene ether of alkylphenol-sodium alkyl sulfate blend) | 0.2 |
| High aromatic naphtha | 4.8 |

The result was a liquid, emulsifiable with water.

Example 4.—Formulation of granular herbicide

One part by weight of Composition No. 2 of Example 1 was sprayed onto ten parts by weight of granular attapulgus clay. The toxicant was absorbed, yielding a dry, free-flowing, granular composition.

Example 5.—Granular formulation

The following were blended in a slightly moist condition and then dried in a tumbling heated drum:

| | Parts by wt. |
|---|---|
| Composition No. 15 of Example 1 | 2 |
| Borax | 98 |

The result was a dry, free-flowing granular solid. When applied in early spring at the rate of twenty pounds per acre of Composition No. 15 on vacant land infested with ragweed, lamb's-quarters, witchgrass, and mustard, substantially one hundred percent control of weed growth was observed throughout the following summer.

Example 6

An area infested with well-established field bindweed (*Convolvulus arvensis*), was divided into plots and sprayed in early spring with emulsions of the test chemicals at the rates indicated. In the following autumn, the plots were inspected and the control of bindweed estimated relative to untreated control plots.

| Compound From Example 1 | Control of Field Bindweed at Rates Indicated[1] | |
|---|---|---|
| | 24 lbs./acre | 48 lbs./acre |
| 1 | 6–8 | 9–10 |
| 3 | 2–3 | 5 |
| 6 | 2–3 | 5 |
| 7 | 5 | 10 |
| 8 | 2–3 | 5 |
| 01 | 1–3 | 3 |
| 31 | 9 | 9 |
| 41 | 9–10 | 10 |
| 51 | 7 | 8 |
| 61 | 7–9 | 9–10 |
| 71 | 9–10 | 9–10 |

[1] Scale: 0=no effect; 1 to 3=slight repression; 4–5=moderate repression, regrowth probable; 6–8=substantial repression, regrowth doubtful; 9=almost complete eradication, no regrowth expected; 10=complete eradication, no viable shoots.

One year after treatment, sorghum, wheat and rye could be planted in the above twenty-four pound per acre plots without serious damage to the seedlings by the residual herbicide.

Example 8

The test area employed was infested with the following established perennial and biennial weeds: bindweed, plantain, wild carrot, Canada thistle, yarrow, daisy, mildweed and quackgrass. Ethoxyethyl trichlorobenzyl ether (made analogously to Example 1, Compound 1), is applied at the rate of eighty pounds per acre in the early summer. One year later, the treated area was completely bare of living vegetation, indicating one hundred percent soil sterilization had been accomplished.

Example 9

A pond infested with sago pondweed (*Potamogeton pectinatus*), and waterweed (*Elodea canadensis*), is treated with an emulsifiable composition containing compositions No. 3 of Example 1, using an amount sufficient to give a concentration of fifty parts per million of the toxicant in the pond water. Within two weeks, the weeds in the treated pond were dead. Fish contained in the pond on the other hand, appeared to be unharmed.

None of the specific embodiments used in the description of this invention shall be considered as limitations upon the scope of the invention, except as included in the accompanying claims.

I claim:

1. Trichlorinated phenylalkoxyalkanol compositions having the structural formula:

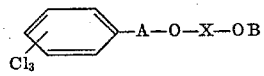

wherein A is an alkylene radical of one to two carbon atoms, X is an organic radical selected from the group consisting of alkylene, alkylene-oxy-alkylene, hydroxyalkylene, and trichlorobenzyloxyalkylene radicals wherein the alkylene groups are of 2 to 3 carbon atoms, and where B is selected from the group consisting of alkyl, alkoxyalkyl, trichlorobenzyl, trichlorobenzyloxyalkyl, phenyl, and chlorinated phenyl wherein the alkyl groups are of 1 to 4 carbon atoms.

2. A composition according to claim 1 wherein at least 30 percent of the trichlorobenzyl radicals are of the 2,3,6-trichloro-configuration.

3. The composition according to claim 1 wherein A is methylene, X is an alkylene radical of from two to three carbon atoms, and B is an alkyl radical of 1 to 4 carbon atoms.

4. A composition according to claim 3 wherein at least 30 percent of the trichlorobenzyl radicals are of the 2,3,6-trichloro-configuration.

5. The composition according to claim 1 wherein A is methylene, X is an alkylene-oxy-alkylene radical having from two to three carbon atoms per alkylene, and wherein B is an alkyl radical of 1 to 4 carbon atoms.

6. A composition according to claim 5 wherein at least 30 percent of the trichlorobenzyl radicals are of the 2,3,6-trichloro-configuration.

7. The composition according to claim 1 wherein A is a methylene, X is an alkylene radical having from two to three carbon atoms, and B is trichlorobenzyl.

8. A composition according to claim 7 wherein at least 30 percent of the trichlorobenzyl radicals are of the 2,3,6-trichloro-configuration.

9.

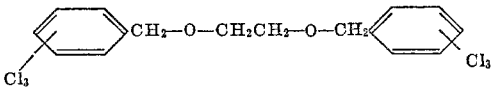

10.

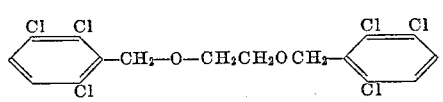

References Cited

UNITED STATES PATENTS 2,366,203  1/1945  Livak _____ 260—611
3,006,967  10/1961  Newcomer et al. _____ 260—611

BERNARD HELFIN, *Primary Examiner.*

D. D. HORWITZ, CHARLES B. PARKER, LEON ZITVER, *Examiners.*

UNITED STATES PATENT OFFICE
CERTIFICATE OF CORRECTION

Patent No. 3,377,384                                                             April 9, 1968

Edwin Dorfman

It is certified that error appears in the above identified patent and that said Letters Patent are hereby corrected as shown below:

Column 1, lines 48 to 50, the formula should appear as shown below:

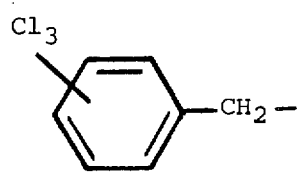

Column 2, lines 33 to 35, the formula should appear as shown below:

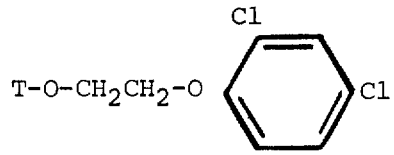

Column 9, compound 21, in the column headed "Product" the left-hand portion of the formula should appear as shown below:

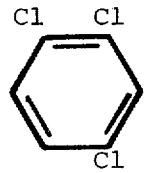

same column 9, footnote B, "ehloride" should read -- chloride --. Column 11, lines 8 to 12, in the listing of the numbers under "Compound From Example I", "01, 31, 41, 51, 61 and 71" should read -- 10, 13, 14, 15, 16 and 17 --, respectively.

Signed and sealed this 7th day of April 1970.

(SEAL)
Attest:

EDWARD M. FLETCHER, JR.                                        WILLIAM E. SCHUYLER, JR.
Attesting Officer                                                        Commissioner of Patents